(12) United States Patent
Hansen

(10) Patent No.: US 7,046,134 B2
(45) Date of Patent: May 16, 2006

(54) SCREEN SHARING

(75) Inventor: James R. Hansen, Franklin, MA (US)

(73) Assignee: Axeda Corporation, Mansfield, MA (US)

( * ) Notice: Subject to any disclaimer, the term of this patent is extended or adjusted under 35 U.S.C. 154(b) by 73 days.

(21) Appl. No.: 10/609,009

(22) Filed: Jun. 27, 2003

(65) Prior Publication Data

US 2004/0075619 A1 Apr. 22, 2004

Related U.S. Application Data

(60) Provisional application No. 60/392,448, filed on Jun. 27, 2002.

(51) Int. Cl.
*G08B 29/00* (2006.01)

(52) U.S. Cl. .................. 340/506; 340/286.02; 709/204

(58) Field of Classification Search ............... 340/506, 340/525, 286.02, 815.4; 709/204, 205; 348/14.01, 348/14.07; 715/717
See application file for complete search history.

(56) References Cited

U.S. PATENT DOCUMENTS

| | | | | |
|---|---|---|---|---|
| 5,583,993 | A | * | 12/1996 | Foster et al. ................. 709/205 |
| 5,727,155 | A | | 3/1998 | Dawson ....................... 709/205 |
| 5,758,110 | A | * | 5/1998 | Boss et al. ................... 715/751 |
| 5,933,597 | A | * | 8/1999 | Hogan ......................... 709/204 |
| 5,970,149 | A | | 10/1999 | Johnson ....................... 714/46 |
| 6,029,191 | A | * | 2/2000 | Kurashima ................... 709/205 |
| 6,057,856 | A | * | 5/2000 | Miyashita et al. ........... 345/633 |
| 6,185,602 | B1 | * | 2/2001 | Bayrakeri .................... 709/204 |
| 6,329,984 | B1 | | 12/2001 | Boss et al. ................... 715/723 |
| 6,570,590 | B1 | * | 5/2003 | Dubrow et al. ............. 715/751 |
| 2002/0064138 | A1 | | 5/2002 | Saito et al. | |

FOREIGN PATENT DOCUMENTS

WO    WO 02/15026    2/2002

OTHER PUBLICATIONS

P.F. Fitzgerald, et al., "Research Display Sharing Techniques in a Distributed Networking Environment Based on the X Window Graphics System", Proceedings of the 19th Annual Conference on Computer Science, 1999, pp. 478-486, XP002261679, S. Antonio, Texas, US.
International Search Report mailed Jan. 15, 2004 PCT/US03/20581.

* cited by examiner

*Primary Examiner*—Toan N. Pham
(74) *Attorney, Agent, or Firm*—Fish & Richardson P.C.

(57) ABSTRACT

A screen sharing system includes receiving an indication of a screen sharing condition from a remote device, receiving data from a viewing device, and hosting a screen sharing session between the remote device and the viewing device. Hosting may include making a session key available to the remote device and to the viewing device, the session key providing access to the screen sharing session, receiving session keys from both the remote device and the viewing device, and establishing the screen sharing session in response to receiving the session keys.

90 Claims, 2 Drawing Sheets

SCREEN SHARING

CROSS-REFERENCE TO RELATED APPLICATION

This application claims priority to U.S. Provisional Application No. 60/392,448, which was filed on Jun. 27, 2002. The contents of U.S. Provisional Application No. 60/392,448 are hereby incorporated by reference into this application as if set forth herein in full.

TECHNICAL FIELD

This invention relates generally to sharing screen information from one device with another device and, more particularly, to using a separate host device to mediate a screen sharing session between the two devices.

BACKGROUND

Oftentimes the need exists to view the graphical user interface (GUI) of one device on another device. For example, if a problem arises on remote device, a technician at a viewing device may be able to address the problem by signing onto a computer and viewing the GUT of the device with the problem. This eliminates the need for the technician to travel to the problem site.

Products currently exist for sharing a device's GUI with another device. In such products, a client (the viewing device) links to a server (the remote sharing device) either directly or via a modem. Once a link is established, the remote device provides its graphics to the viewing device, where the graphics can be viewed. This type of screen sharing is common on private local area networks (LANs). However, because the remote device must be addressed directly, this type of screen sharing is generally not usable over a public network, such as the Internet, particularly in cases where the remote device is located behind a firewall or other security system.

SUMMARY

In general, in one aspect, the invention is directed to a method, which includes receiving an indication of a screen sharing condition from a remote device, receiving data from a viewing device, and hosting a screen sharing session between the remote device and the viewing device. Capabilities associated with the screen sharing session are based on the screen sharing condition.

Advantageously, a host device may be used to host the screen sharing session between the remote device and the viewing device. The host device may be located outside of a firewall or internal network on which the remote device resides, making the host device accessible to both the remote device and the viewing device. As such, use of the host device reduces the need to address the remote device directly to perform screen sharing. Screen sharing thus can be implemented over a public network, such as the Internet, and in cases where the remote device is located behind a firewall or other security system.

Another advantage results from capabilities associated with the screen sharing session being based on the screen sharing condition. More specifically, the amount of control a viewing device has over a remote device in a screen sharing session may be dictated by conditions (e.g., screen sharing conditions) on the remote device.

By way of example, if a blood analyzer having an associated computer (with display screen) is currently operating, operational conditions of the blood analyzer may limit the amount that a viewing device can change the configuration of the blood analyzer. In this circumstance, the viewing device may be limited, e.g., to viewing the display screen of the blood analyzer. Under more favorable conditions, the viewing device may reconfigure the blood analyzer via the blood analyzer's computer during a screen sharing session with the computer.

The foregoing aspect of the invention may also include one or more of the following features.

The indication of a screen sharing condition may be an indication of an alarm condition in the remote device. The alarm condition may indicate a problem with the remote device and/or may be timing data. The indication may be received as a series of pings output by the remote device. The pings may decrease in frequency over time.

The data received from the viewing device may identify the viewing device and the remote device. Hosting the screen sharing session may include determining an extent to which the viewing device is permitted to share the screen of (e.g., control) the remote device based on one or more predetermined rules. The screen sharing condition may include a state of the remote device. Hosting the screen sharing session may include determining an extent to which the viewing device is permitted to share the screen of the remote device based on the state of the remote device.

Hosting the screen sharing session may include transmitting information associated with the screen sharing session between the remote device and the viewing device. Hosting may also include transferring a file between the remote device and the viewing device.

Information prior to (e.g., during set-up), and during, the screen sharing session may be transmitted using HTTP. The information may encrypted.

Hosting the screen sharing session may include transmitting graphics changes between the remote device and the viewing device. The graphics changes may include only portions of graphics on the remote device that are changed.

Hosting the screen sharing session may include storing, in an audit log, information relating to the screen sharing session. Hosting may also include making a session key available to the remote device and to the viewing device, the session key providing access to the screen sharing session, receiving session keys from both the remote device and the viewing device, and establishing the screen sharing session in response to receiving the session keys. The session keys may be made available by providing the session keys directly to the remote device and to the viewing device. The session keys may be made available by posting the session keys on a Web page.

Hosting the screen sharing session may include changing capabilities associated with the screen sharing session dynamically in response to a change in the screen sharing condition. Changing the capabilities associated with the screen sharing session may include terminating the screen sharing session or reducing an amount of control over the remove device via the screen sharing session.

Hosting the screen sharing session may include directing communications transmitted during the screen sharing session to one of multiple hosts. A report relating to the screen sharing session may be generated.

In general, in another aspect, the invention is directed to a method, which includes outputting an indication to a host device that a screen sharing condition has occurred and establishing a screen sharing session via the host device. The screen sharing session includes receiving user inputs via the host device and providing graphics changes to the host device. This aspect may include one or more of the following features.

The indication may be an alarm condition indicative of a problem and/or time data. The screen sharing session may be established by obtaining a session key made available by the host device and providing the session key to the host device. Information relating to the screen sharing session may be transmitted via the host device using HTTP.

The user inputs may include mouse data and keyboard data and the graphics changes may include updates that occurred since transmitting a previous graphics change.

In general, in another aspect, the invention is directed to a method, which includes receiving an indication from a remote device that a screen sharing condition has occurred and establishing a screen sharing session with the remote device via the host device. All communications with the remote device associated with the screen sharing session are via the host device.

This aspect may include one or more of the following features. The indication may be an alarm condition indicative of a problem and/or time data. The screen sharing session may be established by obtaining a session key made available by the host device and providing the session key to the host device.

In general, in another aspect, the invention is directed to method, performed by a remote device, of controlling a screen sharing session with a viewing device. The method includes receiving information from the viewing device and determining if the viewing device is permitted to enter into a screen sharing session with the remote device. If the viewing device is permitted to enter into a screen sharing session with the remote device, the screen sharing session between the remote device and the viewing device is controlled based on a state of the remote device.

These and other advantages of the invention will become apparent from the following description, including the drawings and claims.

DESCRIPTION

Figure 1:
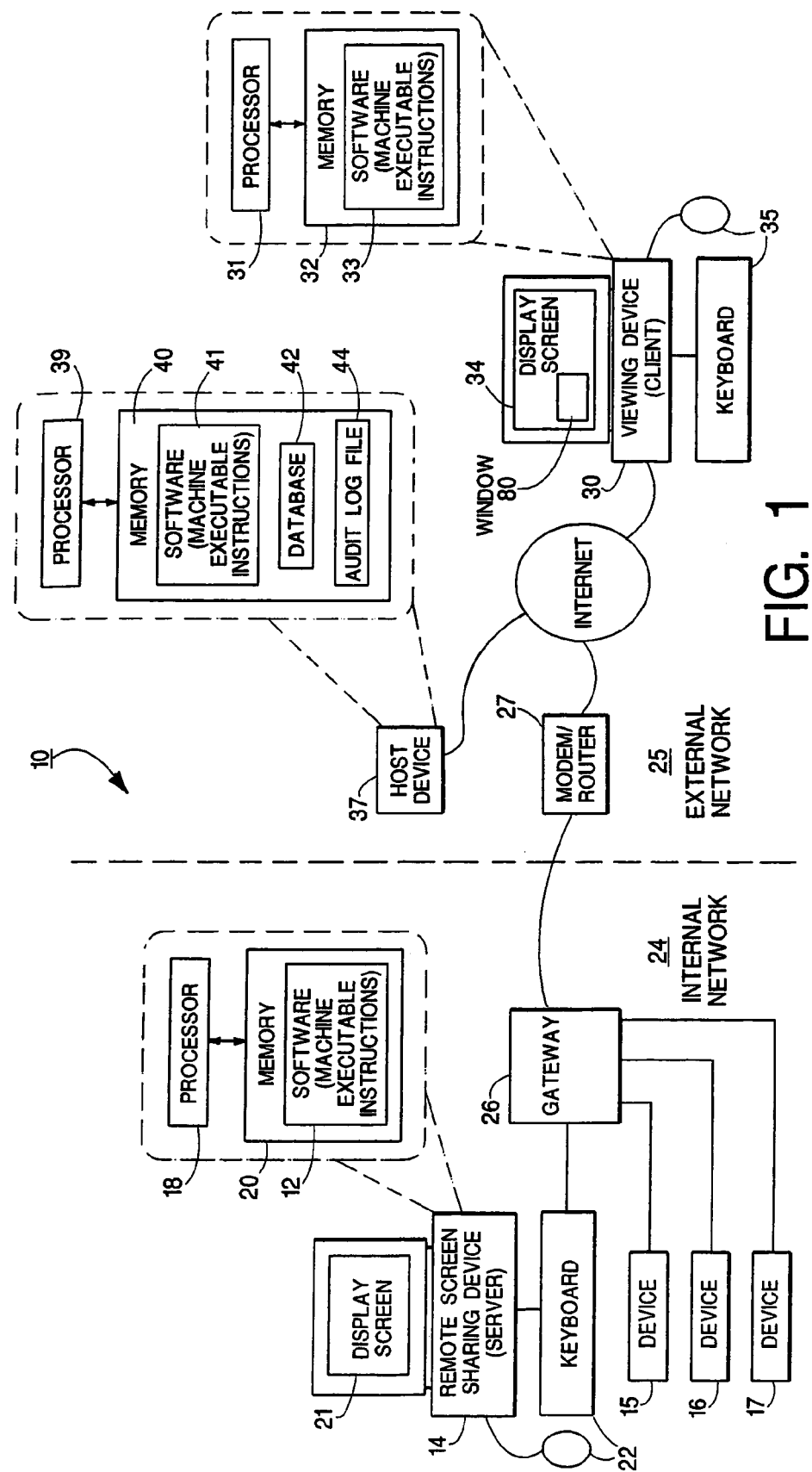
FIG. 1 is a block diagram of a network containing a viewing device, a remote device that shares its screen information with the viewing device, and a host device through which a screen sharing session is implemented.

FIG. 1 shows a network 10. Network 10 includes multiple devices 14 to 17. Each of these devices may be connected to (and monitored or controlled by) a computer with a display screen. Alternatively, each of these devices may include an embedded controller (or a non-embedded associated controller) and a display screen.

An embedded controller is a microprocessor or other circuitry, which monitors and/or controls the device and which displays graphics relating to the device on a corresponding display screen. Devices 14 to 17 may be any type of apparatus or system including, but not limited to, computers, home appliances, office equipment, medical devices, industrial tools, robots, blood analyzers, multifunction copiers, and air conditioning systems.

Device 14 (hereinafter "remote device 14") is shown in detail. In this embodiment remote device 14 is a server (i.e., a computer), which includes a processor 18, a memory 20, a display screen 21, and a user interface 22, such as a mouse and a keyboard. The other devices 15 to 17 may have similar, or different, configurations.

Devices 14 to 17 are connected to an internal network 24, which may be a wired or wireless network, serial data line, or power line(s) (e.g., such as a home network configured using AC (Alternating Current) power lines as communications media). Internal network 24 is connected to an external network 25, such as the Internet, via a network gateway 26 or the like. Gateway 26 may be used to resolve internal IP (Internet Protocol) addresses and to maintain a firewall between internal network 24 and external network 25. The firewall prevents (or limits) unauthorized access to devices on internal network 24, including, but not limited to, devices on external network 25 directly accessing devices 14 to 17 on the internal network.

A router or modem 27 couples internal network 24 to external network 25. It is noted that the network gateway may be omitted from network 10, leaving router or modem 27 to perform the gateway functions. External network 25 runs TCP/IP (Transmission Control Protocol/Internet Protocol) or some other suitable protocol. Communications between devices 14 to 17 on internal network 24 and devices (described below) on external network 25 may be via HTTP (HyperText Transfer Protocol). Network connections throughout internal network 24 and external network 25 may be via Ethernet, telephone line, wireless links, or other transmission media.

External network 25 contains a viewing device (client) 30, which is a computer, or any other processing device, that includes a processor 31, a memory 32, a display screen 34, and a user interface 35 (e.g., a mouse and a keyboard). As described below, viewing device 30 accesses graphics displayed on remote device 14 via a host device 37 on external network 25. Viewing device 30 may be used to control remote device 14 to an extent. This feature is also described below.

Host device 37 is a computer that runs TCP/IP and HTTP and/or other suitable protocols. Host device 37 includes a processor 39 and a memory 40, which stores software 41 (i.e., machine-executable instructions) and database 42. Host device 37 executes software 41 to communicate over external network 25 and to perform the functions described below in FIG. 2 for establishing and mediating a screen sharing session between a device (e.g., viewing device 30) on external network 25 and a device (e.g., remote device 14) on internal network 24.

Software 41 may also host a Web page associated with the host device. The Web page (not shown) may be displayed on the computer of a user, such as viewing device 30, who may use the Web page to access data to establish a screen sharing session with devices on internal network 24.

Software 41 stores and retrieves data in database 42 using application logic (not shown). Database 42 may be stored in memory 40, which may be inside of, or external to, host device 37. Database 42 stores data associated with devices 14 to 17, including, e.g., rules for controlling a screen sharing session with each device on internal network 24. The screen sharing rules may be different for different devices. Database 42 may contain rules specifying how much control a user at viewing device 30 may have based on a state of remote device 14. For example, if host device 37 detects that remote device 14 is in a "dangerous" state, the rules may limit the amount that a user at viewing device 30 can control (e.g., change the configuration of) remote device 14 via screen sharing. Similarly, if, for example, a blood analyzer is currently operating, the rules may limit the amount that the user at viewing device 30 can change its configuration.

Host device 37 may also contain rules governing who can screen share with remote device 14, when screen sharing may take place and/or end, how much and what types of data (e.g., files) may be transmitted to/from remote device 14, and so forth. These rules may be stored beforehand in host device 37, e.g., by remote device 14 or by a third party who controls/owns host device 37.

Rather than storing the rules in host 37, the rules may be stored in remote device 14. In some embodiments, remote device 14 may control at least some screen sharing aspects. These aspects are noted above and may include who can screen share with remote device 14, when screen sharing may take place/end, how much and what types of data may be transmitted to/from remote device 14, and so forth. As above, the rules may be stored in remote device 14 beforehand, e.g., by a party controlling screen sharing.

Memory 40 on host device 37 also may contain an audit log file 44 (or simply an audit log, which need not necessarily be a file). The audit log contains information relating to a screen sharing session hosted by the host device. For example, the audit log may contain the identities (e.g., IP addresses) of two devices engaged in the screen sharing session, the time and date of the session, a record of information, including files, graphics, and user inputs, that were transmitted between the two device, a state of the remote device at the time of the session, and the like. Any information associated with the screen sharing session that is available to host device 37 from either remote device 14 or viewing device 30 may be stored in the audit log.

Figure 2:
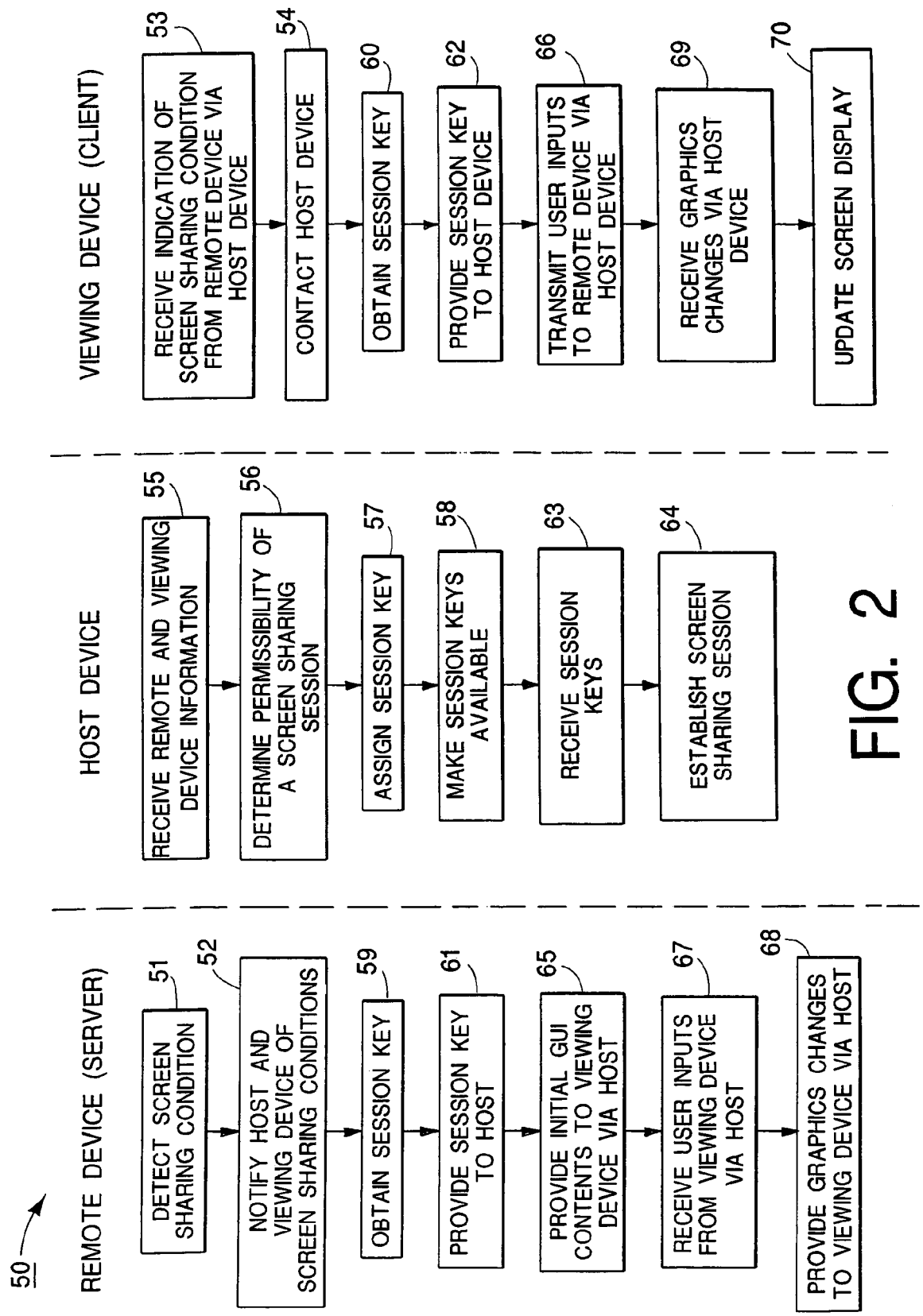
FIG. 2 shows flowcharts of a process for performing a screen sharing session on the network of FIG. 1.

FIG. 2 shows a process 50 for establishing and running a screen sharing session between remote device 14 and viewing device 30 via host device 37. FIG. 2 is broken-down into three portions based on the functions performed by the various devices. For example, remote device 14 performs the functions set forth in the portion labeled "Remote Device (Server)"; host device 37 performs the functions set forth in the portion labeled "Host Device"; and viewing device 30 performs the functions set forth in portion labeled "Viewing Device (Client)".

The breakdown shown in FIG. 2 is but one way of implementing the processes described herein. The invention, however, is not limited by the implementation shown in FIG. 2 or any other described herein.

Processor 18 in remote device 14 executes software (machine-executable instructions) 12 stored in memory 20 to perform its portion of process 50. Processor 31 in viewing device 30 executes software (machine-executable instructions) 33 stored in memory 32 to perform its portion of process 50. Processor 39 in host device 37 executes software (i.e., machine-executable instructions) 41 stored in memory 40 to perform its portion of process 50.

In process 50, remote device 14 detects (51) that a screen sharing condition has occurred. The screen sharing condition may be an alarm condition, such as an indication that there is a problem with the device. Alternatively, the screen sharing condition may be time data, in which case screen sharing may be on a time schedule. For example, remote device 14 may permit screen sharing at specified time intervals, in which case the time data indicates that it is time to permit screen sharing. Other types of screen sharing conditions may also be used.

Remote device 14 notifies (52) viewing device 30 that a screen sharing condition has occurred. Remote device 14 may notify viewing device 30 "offline", meaning via, e.g., pager, electronic mail, telephone, or any other means of communication. A user, such as a technician or the like, acts in response to this notification, as described below.

Remote device 14 also notifies (52) host device 37 that the screen sharing condition has occurred. In one embodiment, remote device 14 "pings" host device 37 periodically when the screen sharing condition occurs. The pinging may decrease in frequency over time, eventually stopping (timing out) if a screen sharing session is not established with remote device 14. Alternatively, the pinging may continue until a session is established. Other types of notifications may be used in lieu of "pings".

In this embodiment, remote device 14 notifies host device 37 only when a screen sharing condition has occurred. Remote device 14 thus does not "ping" host device 37 absent a screen sharing condition. Sending a notification only in response to a screen sharing condition provides an advantage over other host-based screen sharing systems, since it reduce the amount of communications to the host, and thus its amount of used bandwidth. In alternative embodiments, process 50 may control remote device 14 to notify host device 37 in circumstances other than just the occurrence of a screen sharing condition.

Remote device 14 also identifies itself to host device 37. Remote device 14 may identify itself during the initial notification (52) or it may identify itself following a response to the notification from the host device. Remote device 14 may provide host device 37 with the remote device's IP address or some other identifier.

In response to receiving (53) the notification from remote device 14, viewing device 30 (which is operated by a user at viewing device 30) contacts (54) host device 37 to initiate a screen sharing session with remote device 14. Specifically, viewing device 30 identifies itself to host device 37 (e.g., via its IP address) and identifies remote device 14 as the device with which viewing device 30 would like to establish a screen sharing session.

Host device 37 receives (55) the identification information from remote device 14 and viewing device 30 and uses that information to establish a screen sharing session between remote device 14 and viewing device 30. In this embodiment, host device 37 receives, from remote device 14, the indication of the screen sharing condition in remote device 14, the identity of remote device 14, and the state of remote device 14. The state of the device may include information such as whether the device is operating normally and whether the device is operating under dangerous conditions that may limit viewing device 30's control. Host device 37 receives, from viewing device 30, a request to establish a screen sharing session with remote device 14 and the identity of viewing device 30. In other embodiments, different information may be provided.

Using the foregoing information, host device 37 determines (56) if a screen sharing session can be established between remote device 14 and viewing device 30. Host device 37 does this by examining the rules stored in database 42. For example, host device 37 determines if viewing device 30 is permitted to share remote device 14's screen. If so, host device 37 determines the extent to which viewing device 30 can share remote device 14's screen, e.g., if viewing device 30 is restricted to viewing certain types of data, if viewing device 30 is restricted to screen sharing at certain times, if viewing device 30 cannot control certain functions on remote device 14 because of the current state of remote device 14, etc.

If a screen sharing session cannot be established between remote device 14 and viewing device 30, host device 37 may notify each of them that screen sharing is not permitted under the current circumstances. Assuming that screen sharing is permitted between remote device 14 and viewing device 30, host device 37 assigns (57) a session key to the screen sharing session. The session key may be an alphanumeric code associated with the session that enables both remote device 14 and viewing device 30 to connect to the same screen sharing session via host device 37. Host device 37 makes the session key available (58) to both remote device 14 and viewing device 30.

Host device 37 may make the session key available by providing the session key directly to remote device 14 and viewing device 30. The session key may be transmitted via HTTP commands, along with an indication that a screen sharing session is permissible; although such an indication is not necessary. Alternatively, the session key may be published on a Web site. (not shown), which may be password-protected. Viewing device 30 and remote device 14 may obtain the session key via the Web site by entering the appropriate password and appropriate information to identify the screen sharing session. Other methods of providing the session key may also be used.

Once remote device 14 and viewing device 30 obtain (59, 60) the session key, they provide (61, 62) the session key to host device 37. The session key may be provided using HTTP commands. Host device 37 receives (63) the session key from remote device 14 and viewing device 30. Host device 37 authenticates the session keys, determines which devices are associated with the session keys, and establishes (64) a screen sharing session between those devices. Host device 37 may provide an indication to remote device 14 and viewing device 30 once the screen sharing session has been established. Host device 37 also determines if there are any restrictions put on the screen sharing session associated with the session key. If there are any such restrictions, host device 37 may advise remote device 14 and viewing device 30 of the restrictions.

By way of example, remote device 14 may be performing an operation or function that should not be interrupted by a remote device. In this case, host device 37 may query remote device 14 to determine whether the remote device is in a "safe" state, i.e., a state that permits remote control. If the remote device is not in a safe state, rules stored on the host device may cause the host to device to allow screen sharing, but only in a "viewing" mode. In such a mode, the viewing device may be able to view events occurring on the remote device, but cannot operate, or otherwise change configurations or settings of, the remote device. File transfers may also not be permitted in some embodiments. If the remote device is in a safe state, the host device will host a normal screen sharing session, in which the viewing device can change and/or manipulate the remote device.

In embodiments where the screen sharing rules are stored on remote device 14, remote device 14 itself may prevent or limit screen sharing (rather than via host 37). For example, if the remote device is not in a safe state, rules stored on remote device 14 may prevent screen sharing or may allow screen sharing only in the "viewing" mode. In such cases, remote device may notify the host device and/or the viewing device, or take the action on its own.

In further alternative embodiments, the remote device and the host device may both include screen sharing rules. In these embodiments, both devices may have control over the amount and type of screen sharing depending upon the circumstances. The remote device and the host device may communicate and decide cooperatively whether screen sharing should take place under given circumstances.

The state of a remote device may change during a screen sharing session. In this case, host device 37 may dynamically change, mid-session, the amount of control over the remote device that it provides to the viewing device. The state of the remote device may be obtained by querying the remote device (e.g., periodically) or by receiving an indication (without a query) from the remote device. The viewing device is notified of the change in state of the viewing device as well as its reduced control capabilities.

In embodiments where the screen sharing rules are stored on remote device 14, remote device 14 performs the functions of changing, mid-session, the amount of control over the remote device that is provided to the viewing device and/or notifying the viewing device of the change in state as well as its reduced control capabilities.

In some cases, it may be undesirable to permit screen sharing of the remote device. In such cases, host device 37 may terminate a screen sharing session. Rules stored on the host device determine the circumstances under which a screen sharing session should be terminated.

In embodiments where the screen sharing rules are stored on remote device 14, remote device 14 performs the functions of terminating the session and/or notifying the viewing device of the reason for termination.

Communications between remote device 14 and host device 37, and between viewing device 30 and host device 37 may be via HTTP POST commands (for uploading information) and HTTP GET commands (for retrieving information). Thus, for example, viewing device 30 may provide information to host device 37 using an HTTP POST command. Remote device 14 may retrieve this information from host device 37 using an HTTP GET command. Communications may be transmitted using HTTP version 1.1 with chunked output, single GET commands with a persistent connection, and/or HTTP version 1.0. The communications may also be encrypted using any appropriate encryption algorithm.

During the screen sharing session, as during setup, all communications between remote device 14 and viewing device 30 go through host device 37. At the start of the screen sharing session, remote device 14 transmits (65) the initial contents of its display screen 21 to viewing device 30 via host device 37. A window 80 (FIG. 1) may be displayed on the display screen 34 of viewing device 30, which contains the contents (e.g., the GUI) of the display screen 21 associated with remote device 14.

At viewing device 30, a user can view the screen display of remote device 14 and manipulate its contents via user inputs, such as mouse and/or keyboard inputs. As noted above, manipulation may be allowed in some circumstances and not allowed in other circumstances.

User inputs from viewing device 30 may be transmitted (66) to remote device 14 (via host device 37). Remote device 14 receives (67) these user inputs and processes them as if they were entered locally (i.e., by a user at remote device 14). As a result of these user inputs, remote device 14 may modify its GUI. Remote device 14 may transmit (68) these modifications to viewing device 30 (via host device 37). In one embodiment, remote device 14 transmits only those portions of the graphics that have changed as a result of the user inputs. Accordingly, less data needs to be transmitted. In other embodiments, all graphics may be transmitted. Viewing device 30 receives (69) the graphics and updates (70) its window 80 containing the display screen contents of remote device 14.

In addition to graphics and user inputs, files and other documents may be exchanged (via host device 37) between remote device 14 and viewing device 30 during the screen sharing session. These files may be transferred using HTTP, FTP (file transfer protocol), or any other suitable protocol. File transfer capability, including the types of files that may be transmitted, who may transfer files, etc. is controlled by host device 37, in particular, by the rules stored in database 42. In alternative embodiments, file transfer capability may be controlled by rules stored in the remote device.

A screen sharing session may be terminated by either remote device 14 or viewing device 30 by notifying host device 37. Host device 37 may generate a report during, or following, a screen sharing session. The report correlates the screen sharing session with actions, states, and/or devices associated with the screen sharing session.

Host device 37 may also be programmed to perform load balancing among various other host devices. That is, if the traffic on host device 37 exceeds a predetermined level, host device may direct communications to/from remote device 14 and viewing device 30 to another host device (not shown). That other host device, which may have access to database 42, may then perform the same screen sharing session functions as host device 37 with respect to remote device 14 and viewing device 30. Host device 37 will direct all communications relating to a single screen sharing session to a single other host device. Directing the communications to a single other host reduces the need for communication among different host devices.

Process 50 is not limited to use with the hardware/software configuration of FIGS. 1 and 2; it may find applicability in any computing or processing environment. Each portion of process 50 may be implemented in hardware (e.g., an ASIC {Application-Specific Integrated Circuit} and/or an FPGA {Field Programmable Gate Array}), software, or a combination of hardware and software running on one or more of remote device 14, host device 37, viewing device 30, and/or any number of other devices.

Each portion of process 50 may be implemented using one or more computer programs executing on one or more programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer or other machine for configuring and operating the computer when the storage medium or device is read by the computer to perform process 50.

Each portion of process 50 may also be implemented as a machine-readable storage medium, configured with a computer program, where, upon execution, instructions in the computer program cause the computer or other machine to operate in accordance with process 50.

The invention is not limited to use with the protocols and standards described above. For example, software may use Java servlets, ASP (Active Server Pages), ISAPI (Internet Server Application Programming Interface), and/or .NET interfaces to effect communications. The commands used to transmit information between viewing device 30, host device 37, and remote device 14 are not limited to HTTP GET and POST commands. Any commands and/or requests for requesting and receiving data may be used.

Host device 37 and viewing device 30 are depicted as different devices in FIG. 1. However, their functionality may be included on one device, two devices, or more than two devices. Similarly, the functionality of remote device 14 may be spread out over numerous devices. The invention is not limited to the block ordering shown in the flowchart of FIG. 2. Rather, blocks may be executed out of order or omitted in other embodiments.

In other embodiments, the host device may act as merely a conduit for communications between the remote device and the host device. Actual control over screen sharing, file transfers, and the like may be implemented in the viewing device and/or the remote device. The example described above, in which the screen sharing rules are stored in the remote device, is but one example of such an alternative embodiment. In these embodiments, sockets on the viewing device and the remote device transmit communications to the host device which, in this case, operates much like a router.

The functions of FIG. 2 attributed to the host device in process 50 may be distributed between the remote device and the viewing device, as appropriate. For example, remote device 14 may receive, from viewing device 30, a request to establish a screen sharing session with remote device 14 and the identity of viewing device 30. In other embodiments, different information may be provided.

Using the foregoing information, remote device 14 determines if a screen sharing session can be established between remote device 14 and viewing device 30. Remote device 14 does this based on its current state (e.g., if a screen sharing condition has occurred) and the rules stored on remote device. If screen sharing is permitted under the circumstances, host remote device determines the extent to which viewing device 30 can share remote device 14's screen, e.g., if viewing device 30 is restricted to viewing certain types of data, if viewing device 30 is restricted to screen sharing at certain times, if viewing device 30 cannot access certain functions on remote device 14 because of the current state of remote device 14, etc. The screen sharing session then proceeds as described above.

Remote device can also change the capabilities of a screen sharing session dynamically, as described above. Also, if a screen sharing session cannot be established between remote device 14 and viewing device 30, remote device 14 may notify the viewing device that screen sharing is not permitted under the current circumstances.

Other embodiments not described herein are also within the scope of the following claims.

What is claimed is:

1. A method comprising:

receiving an indication of a screen sharing condition from a remote device;

receiving data from a viewing device; and hosting a screen sharing session between the remote device and the viewing device, wherein capabilities associated with the screen sharing session are based on the screen sharing condition;

wherein hosting the screen sharing session comprises:

making a session key available to the remote device and to the viewing device, the session key providing access to the screen sharing session;

receiving session keys from both the remote device and the viewing device; and establishing the screen sharing session in response to receiving the session keys.

2. The method of claim 1, wherein the indication comprises an indication of an alarm condition in the remote device.

3. The method of claim 2, wherein the alarm condition comprises a problem with the remote device.

4. The method of claim 1, wherein the indication comprises timing data.

5. The method of claim 1, wherein the indication is received as a series of pings output by the remote device.

6. The method of claim 5, wherein the pings decrease in frequency over time.

7. The method of claim 1, wherein the data received from the viewing device identifies the viewing device and the remote device.

8. The method of claim 1, wherein hosting comprises determining an extent to which the viewing device is permitted to share a screen of the remote device based on one or more predetermined rules.

9. The method of claim 1, wherein:
the indication of a screen sharing condition comprises a state of the remote device; and
hosting comprises determining an extent to which the viewing device is permitted to share a screen of the remote device based on the state of the remote device.

10. The method of claim 1, wherein hosting comprises transmitting information associated with the screen sharing session between the remote device and the viewing device.

11. The method of claim 1, wherein hosting comprises transferring a file between the remote device and the viewing device.

12. The method of claim 10, wherein information associated with the screen sharing session is transmitted using HTTP.

13. The method of claim 12, wherein the information is encrypted.

14. The method of claim 1, wherein hosting comprises transmitting graphics changes between the remote device and the viewing device, the graphics changes comprising only portions of graphics on the remote device that are changed.

15. The method of claim 1, wherein hosting comprises storing, in an audit log, information relating to the screen sharing session.

16. The method of claim 1, wherein the session keys are made available by providing the session keys directly to the remote device and to the viewing device.

17. The method of claim 1, wherein the session keys are made available by posting the session keys on a Web page.

18. The method of claim 1, wherein hosting comprises changing capabilities associated with the screen sharing session dynamically in response to a change in the screen sharing condition.

19. The method of claim 18, wherein changing comprises terminating the screen sharing session or reducing an amount of control over the remove device provided via the screen sharing session.

20. The method of claim 1, further comprising generating a report relating to the screen sharing session.

21. The method of claim 1, wherein hosting comprises directing communications transmitted during the screen sharing session to one of multiple hosts.

22. A method comprising:
outputting an indication to a host device that a screen sharing condition has occurred; and
establishing a screen sharing session via the host device, the screen sharing session comprising:
receiving user inputs via the host device; and
providing graphics changes to the host device;
wherein the screen sharing session is established by:
obtaining a session key made available by the host device; and
providing the session key to the host device.

23. The method of claim 22, wherein the indication comprises an alarm condition indicative of a problem.

24. The method of claim 22, wherein the indication comprises time data.

25. The method of claim 22, wherein information relating to the screen sharing session is transmitted via the host device using HTTP.

26. The method of claim 22, wherein the user inputs comprise mouse data and keyboard data and the graphics changes comprise updates that occurred since transmitting a previous graphics change.

27. A method comprising:
receiving an indication from a remote device that a screen sharing condition has occurred; and
establishing a screen sharing session with the remote device via a host device;
wherein all communications with the remote device associated with the screen sharing session are via the host device; and
wherein the screen sharing session is established by:
obtaining a session key made available by the host device; and
providing the session key to the host device.

28. The method of claim 27, wherein the indication comprises an alarm condition indicative of a problem.

29. The method of claim 27, wherein the indication comprises time data.

30. A machine-readable medium that stores executable instructions that cause a machine to:
receive an indication of a screen sharing condition from a remote device;
receive data from a viewing device; and
host a screen sharing session between the remote device and the viewing device, wherein capabilities associated with the screen sharing session are based on the screen sharing condition;
wherein hosting the screen sharing session comprises:
making a session key available to the remote device and to the viewing device, the session key providing access to the screen sharing session;
receiving session keys from both the remote device and the viewing device; and
establishing the screen sharing session in response to receiving the session keys.

31. The machine-readable medium of claim 30, wherein the indication comprises an indication of an alarm condition in the remote device.

32. The machine-readable medium of claim 31, wherein the alarm condition comprises a problem with the remote device.

33. The machine-readable medium of claim 30, wherein the indication comprises timing data.

34. The machine-readable medium of claim 30, wherein the indication is received as a series of pings output by the remote device.

35. The machine-readable medium of claim 34, wherein the pings decrease in frequency over time.

36. The machine-readable medium of claim 30, wherein the data received from the viewing device identifies the viewing device and the remote device.

37. The machine-readable medium of claim 30, wherein hosting comprises determining an extent to which the viewing device is permitted to share a screen of the remote device based on one or more predetermined rules.

38. The machine-readable medium of claim 30, wherein:
the indication of a screen sharing condition comprises a state of the remote device; and
hosting comprises determining an extent to which the viewing device is permitted to share a screen of the remote device based on the state of the remote device.

39. The machine-readable medium of claim 30, wherein hosting comprises transmitting information associated with the screen sharing session between the remote device and the viewing device.

40. The machine-readable medium of claim 30, wherein hosting comprises transferring a file between the remote device and the viewing device.

41. The machine-readable medium of claim 30, wherein information associated with the screen sharing session is transmitted using HTTP.

42. The machine-readable medium of claim 41, wherein the information is encrypted.

43. The machine-readable medium of claim 30, wherein hosting comprises transmitting graphics changes between the remote device and the viewing device, the graphics changes comprising only portions of graphics on the remote device that are changed.

44. The machine-readable medium of claim 30, wherein hosting comprises storing, in an audit log, information relating to the screen sharing session.

45. The machine-readable medium of claim 30, wherein the session keys are made available by providing the session keys directly to the remote device and to the viewing device.

46. The machine-readable medium of claim 30, wherein the session keys are made available by posting the session keys on a Web page.

47. The machine-readable medium of claim 30, wherein hosting comprises directing communications transmitted during the screen sharing session to one of multiple hosts.

48. The machine-readable medium of claim 30, wherein hosting comprises changing capabilities associated with the screen sharing session dynamically in response to a change in the screen sharing condition.

49. The machine-readable medium of claim 48, wherein changing comprises terminating the screen sharing session or reducing an amount of control over the remove device provided via the screen sharing session.

50. The machine-readable medium of claim 30, further comprising executable instructions to generate a report relating to the screen sharing session.

51. A machine-readable medium that stores executable instructions that cause a machine to:
output an indication to a host device that a screen sharing condition has occurred; and
establish a screen sharing session via the host device, the screen sharing session comprising:
receiving user inputs via the host device; and
providing graphics changes to the host device;
wherein the screen sharing session is established by:
obtaining a session key made available by the host device; and
providing the session key to the host device.

52. The machine-readable medium of claim 51, wherein the indication comprises an alarm condition indicative of a problem.

53. The machine-readable medium of claim 51, wherein the indication comprises time data.

54. The machine-readable medium of claim 51, wherein information relating to the screen sharing session is transmitted via the host device using HTTP.

55. The machine-readable medium of claim 51, wherein the user inputs comprise mouse data and keyboard data and the graphics changes comprise updates that occurred since transmitting a previous graphics change.

56. A machine-readable medium that stores executable instructions that cause a machine to:
receive an indication from a remote device that a screen sharing condition has occurred; and
establish a screen sharing session with the remote device via the host device;
wherein all communications with the remote device associated with the screen sharing session are via the host device; and
wherein the screen sharing session is established by:
obtaining a session key made available by the host device; and
providing the session key to the host device.

57. The machine-readable medium of claim 56, wherein the indication comprises an alarm condition indicative of a problem.

58. The machine-readable medium of claim 56, wherein the indication comprises time data.

59. An apparatus comprising circuitry to:
receive an indication of a screen sharing condition from a remote device;
receive data from a viewing device; and
host a screen sharing session between the remote device and the viewing device, wherein capabilities associated with the screen sharing session are based on the screen sharing condition;
wherein hosting the screen sharing session comprises:
making a session key available to the remote device and to the viewing device, the session key providing access to the screen sharing session;
receiving session keys from both the remote device and the viewing device; and
establishing the screen sharing session in response to receiving the session keys.

60. The apparatus of claim 59, wherein the indication comprises an indication of an alarm condition in the remote device.

61. The apparatus of claim 60, wherein the alarm condition comprises a problem with the remote device.

62. The apparatus of claim 59, wherein the indication comprises timing data.

63. The apparatus of claim 59, wherein the indication is received as a series of pings output by the remote device.

64. The apparatus of claim 63, wherein the pings decrease in frequency over time.

65. The apparatus of claim 59, wherein the data received from the viewing device identifies the viewing device and the remote device.

66. The apparatus of claim 59, wherein hosting comprises determining an extent to which the viewing device is permitted to share a screen of the remote device based on one or more predetermined rules.

67. The apparatus of claim 59, wherein:
the indication of a screen sharing condition comprises a state of the remote device; and
hosting comprises determining an extent to which the viewing device is permitted to share a screen of the remote device based on the state of the remote device.

68. The apparatus of claim 59, wherein hosting comprises transmitting information associated with the screen sharing session between the remote device and the viewing device.

69. The apparatus of claim 59, wherein hosting comprises transferring a file between the remote device and the viewing device.

70. The apparatus of claim 59, wherein information associated with the screen sharing session is transmitted using HTTP.

71. The apparatus of claim 70, wherein the information is encrypted.

72. The apparatus of claim 59, wherein hosting comprises transmitting graphics changes between the remote device and the viewing device, the graphics changes comprising only portions of graphics on the remote device that are changed.

73. The apparatus of claim 59, wherein hosting comprises storing, in an audit log, information relating to the screen sharing session.

74. The apparatus of claim 59, wherein the session keys are made available by providing the session keys directly to the remote device and to the viewing device.

75. The apparatus of claim 59, wherein the session keys are made available by posting the session keys on a Web page.

76. The apparatus of claim 59, wherein hosting comprises directing communications transmitted during the screen sharing session to one of multiple hosts.

77. The apparatus of claim 59, wherein hosting comprises changing capabilities associated with the screen sharing session dynamically in response to a change in the screen sharing condition.

78. The apparatus of claim 77, wherein changing comprises terminating the screen sharing session or reducing an amount of control over the remove device provided via the screen sharing session.

79. The apparatus of claim 59, wherein the circuitry generates a report relating to the screen sharing session.

80. The apparatus of claim 59, wherein the circuitry comprises at least one of programmable logic, a processor, a memory, and logic gates.

81. An apparatus comprising circuitry to:
output an indication to a host device that a screen sharing condition has occurred; and
establish a screen sharing session via the host device, the screen sharing session comprising:
receiving user inputs via the host device; and
providing graphics changes to the host device;
wherein the screen sharing session is established by:
obtaining a session key made available by the host device; and
providing the session key to the host device.

82. The apparatus of claim 81, wherein the indication comprises an alarm condition indicative of a problem.

83. The apparatus of claim 81, wherein the indication comprises time data.

84. The apparatus of claim 81, wherein information relating to the screen sharing session is transmitted via the host device using HTTP.

85. The apparatus of claim 81, wherein the user inputs comprise mouse data and keyboard data and the graphics changes comprise updates that occurred since transmitting a previous graphics change.

86. The apparatus of claim 81, wherein the circuitry comprises at least one of programmable logic, a processor, a memory, and logic gates.

87. The apparatus of claim 81, wherein the circuitry comprises at least one of programmable logic, a processor, a memory, and logic gates.

88. A method, performed by a remote device, of controlling a screen sharing session with a viewing device, the method comprising:
receiving information from the viewing device; and
determining if the viewing device is permitted to enter into a screen sharing session with the remote device;
wherein, if the viewing device is permitted to enter into a screen sharing session with the remote device, the method further comprises controlling the screen sharing session between the remote device and the viewing device based on a state of the remote device.

89. A machine-readable medium that stores executable instructions to control a screen sharing session between a remote device a viewing device, the instructions causing the remote device to:
receive information from the viewing device;
determine if the viewing device is permitted to enter into a screen sharing session with the remote device; and
control the screen sharing session between the remote device and the viewing device based on a state of the remote device if the viewing device is permitted to enter into a screen sharing session with the remote device.

90. An apparatus to control a screen sharing session with a viewing device, the apparatus comprising circuitry to:
receive information from the viewing device;
determine if the viewing device is permitted to enter into a screen sharing session with the apparatus; and
control the screen sharing session between the apparatus and the viewing device based on a state of the apparatus if the viewing device is permitted to enter into a screen sharing session with the apparatus.

* * * * *